UNITED STATES PATENT OFFICE.

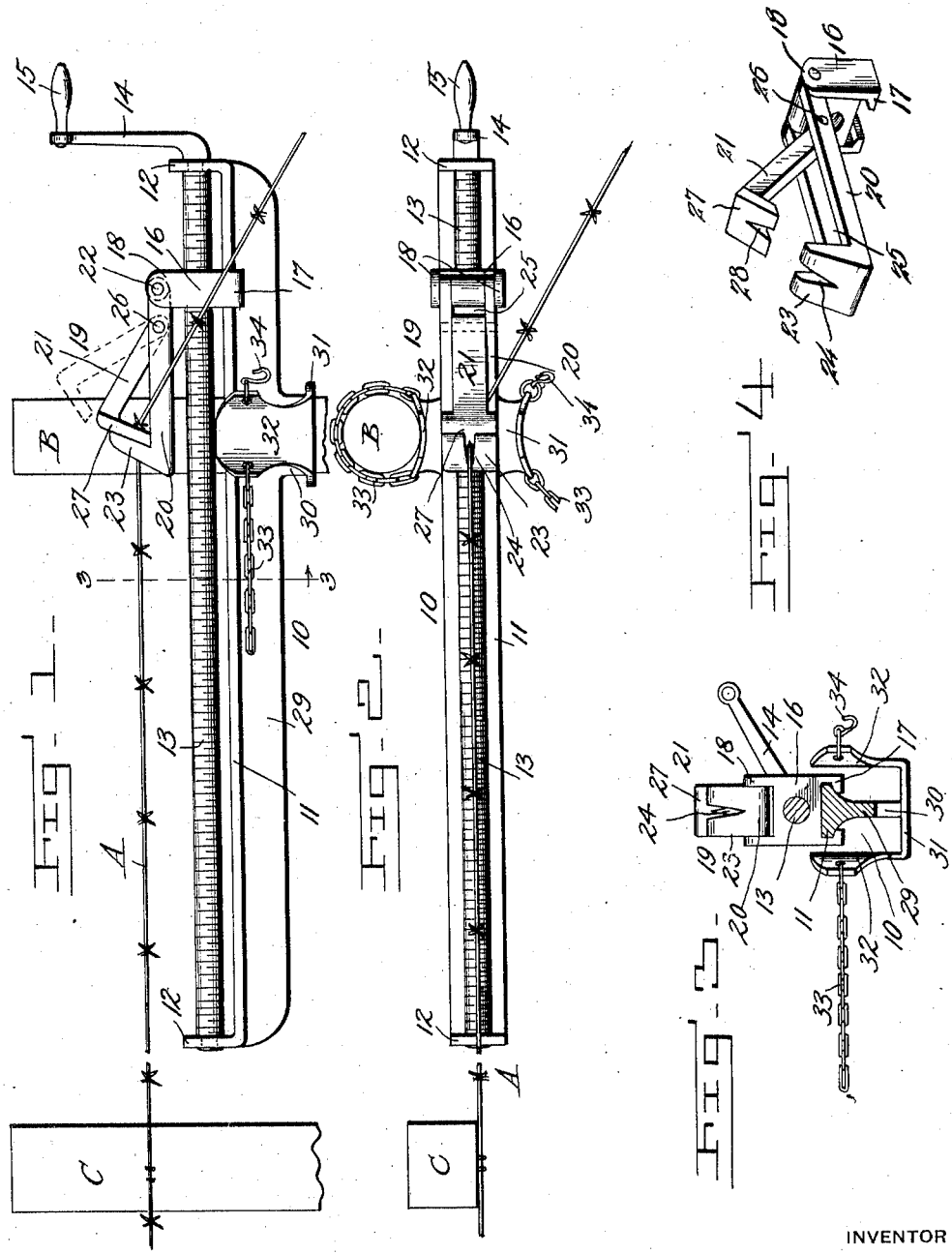

DEZERE CLYNEKE, OF BOULDER, COLORADO.

WIRE-STRETCHER.

1,334,990.  Specification of Letters Patent.  Patented Mar. 30, 1920.

Application filed October 19, 1916, Serial No. 126,610. Renewed November 20, 1919. Serial No. 339,321.

*To all whom it may concern:*

Be it known that I, DEZERE CLYNEKE, a citizen of Belgium, residing at Boulder, in the county of Boulder and State of Colorado, have invented certain new and useful Improvements in Wire-Stretchers, of which the following is a specification.

This invention relates to wire stretchers, and has for its object to provide an implement for tensioning single strands of wire, and is adapted for fence, telegraph, telephone and other wires which are supported upon and fastened to posts or poles and which require to be tightened as they are erected.

Another object of the invention is to provide a wire stretcher which is simple in construction, made of few parts and which may be connected with equal facility on opposite sides of a post or pole preparatory to stretching a wire leading to said pole from another at a distance therefrom.

With these objects in view, the invention consists of the novel construction, combination, and arrangement of parts hereinafter described, pointed out in the appended claim and illustrated in the accompanying drawings, in which—

Figure 1 is a side elevation of the wire stretcher mounted upon a pole in position for use.

Fig. 2 is a top plan view of the same.

Fig. 3 is a vertical cross sectional view on the line 3—3 of Fig. 1, and

Fig. 4 is a perspective view of the wire clamp detached.

In the drawings 10 indicates a beam preferably made of metal of a T shape in cross section, the head 11 of which is turned upwardly at each end to form bearings 12 for a stem 13 parallel with the beam 10 and provided with a screw thread, as shown from end to end thereof. The screw stem 13 rotates freely in the bearings 12 and on one end without the bearing is secured a crank 14 having a handle 15 by means of which the screw stem is rotated.

Threaded on the stem 13 is a nut 16 having downwardly projecting fingers 17 that extend below the head 11 of the beam and are turned thereunder to form guides for the nut 16 as it is moved longitudinally on said beam by the rotation of the screw stem 13. Extending upwardly from the top of the nut are two ears 18 in which is pivoted a wire clamp 19 formed of two hook-like members 20 and 21 pivoted together. The member 20 has one end inserted between the ears 18 and connected thereto by a pivot 22, the other end of the member being provided with an upwardly and rearwardly inclined lug 23 in which is formed a tapering notch 24 to receive a wire strand A. Between the ends of the member 20 is a through slot 25 within which projects one end of the coöperating member 21 secured to the member 20 by a pin 26. At its opposite end the member 21 is provided with a downwardly projecting lug 27 in which is formed a downwardly opening tapered notch 28. The member 21 may be raised entirely free of the member 20 to permit the wire A being inserted in the notch 24, after which the member 21 is closed downwardly over the wire, the lug 27 passing behind the lug 23 and the tapered notch in the lug 27 pressing the wire downwardly in the notch 24 of lug 23 wedges the wire tightly in the two notches and holds the same securely while the wire is being stretched.

The web portion 29 of the beam 10 is projected downwardly at 30 intermediate the ends of the beam for a short distance, and has secured at its lower end integrally or otherwise to a transverse plate 31, the ends of which extend outwardly beyond the plane of the beam on each side and then turned upwardly as at 32 above the beam to form horizontally curved cheek plates either of which may be placed against the side of a post or pole B and be secured thereto by a chain 33 attached to one side of the cheek plate and of sufficient length to pass around the post or pole and be secured by a hook 34 on the other side of said plate, each of said cheek plates being provided with a chain and hook as shown.

In using the implement the latter is attached to a post B by one of the cheek plates 32 and chain 33 with the end carrying the handle away from the post or pole C to which the wire A is attached. The screw stem 13 is then turned in a direction to cause the nut 16 to move away from the handled end toward the pole C until it reaches the end or substantially the end of the implement. The members 20 and 21 of the wire clamp are then separated and the wire placed between them and clamped as described, after which the crank 14 is rotated and the nut 16 caused to move toward the handled end tightening the wire as the nut moves rearwardly until said nut has reached the opposite end of the screw stem 13, at which time the wire clamp 19 will have passed the post B, thus enabling the wire to be readily secured to said post by means of staples as shown, or securing the wire to insulators if telegraph and telephone wires are being stretched. After securing the wires, the screw stem is turned a short distance in the reverse direction to loosen the tension of the wire and permit the wire clamp to be disengaged therefrom so that the stretching implement may be moved to another position on the pole B or entirely disconnected therefrom and taken to another pole.

What I claim is:

In a wire stretcher, a wire grip therefor comprising a pair of hook like members pivoted together, each member having an angular end provided with a V-shaped notch therein, said ends adapted to overlap to cause the notches to coöperate for clamping between said notches a wire to be stretched.

In testimony whereof I affix my signature in presence of two witnesses.

DEZERE CLYNEKE.

Witnesses:
JOSEPH WATSON, Jr.,
ALLAN MCDONALD.